United States Patent [19]

Karvinen

[11] Patent Number: 5,443,811
[45] Date of Patent: Aug. 22, 1995

[54] METHOD OF PREPARING TITANIUM DIOXIDE

[75] Inventor: Saila Karvinen, Pori, Finland

[73] Assignee: Kemira Oy, Helsinki, Finland

[21] Appl. No.: 66,915

[22] Filed: May 24, 1993

Related U.S. Application Data

[63] Continuation of Ser. No. 663,492, Mar. 1, 1991, abandoned.

[30] Foreign Application Priority Data

Mar. 1, 1990 [FI] Finland ................................. 901053

[51] Int. Cl.$^6$ .............................................. C01G 23/04
[52] U.S. Cl. ..................................... 423/616; 423/610
[58] Field of Search ................................ 423/616, 610

[56] References Cited

U.S. PATENT DOCUMENTS

| Re. 31,602 | 6/1984 | Makinen | 106/438 |
|---|---|---|---|
| 2,448,683 | 9/1948 | Peterson | 423/616 |
| 2,480,869 | 9/1949 | Mayer | 423/616 |
| 2,494,492 | 1/1950 | Ross et al. | 423/616 |
| 4,166,147 | 8/1979 | Lange et al. | 423/610 |
| 4,268,422 | 5/1981 | Becker et al. | 423/616 |
| 4,605,631 | 8/1986 | Rossi | 501/1 |

FOREIGN PATENT DOCUMENTS

| 962142 | 2/1975 | Canada . |
|---|---|---|
| 57124 | 6/1980 | Finland . |
| 381790A1 | 12/1988 | Germany . |
| 2205088 | 11/1988 | United Kingdom . |

OTHER PUBLICATIONS

Official Action for Kemura Oy, Finland dated 16 Jun. 1992.
Finnish Office Action w/English translation (901053) (no date).
EP Search Report (913011839) (no date).

*Primary Examiner*—Steven Bos
*Attorney, Agent, or Firm*—Biebel & French

[57] ABSTRACT

The invention relates to a method of preparing microcrystalline titanium dioxide, in which a) the solid titanium dioxide hydrate is treated with a base, b) the precipitate treated with the base is treated with hydrochloric acid, and c) the precipitate treated with the base and the hydrochloric acid is neutralized. It has been noted that useable rutile crystals, a more appropriate crystal size and crystal size distribution and that chemicals can be saved if as the final hydrochloric acid content of the stage a) is adjusted a lower value than usually, being about 8 to 25 g/liter, for the precipitation of microcrystalline titanium dioxide. Hereby the neutralization of the stage c) can also be carried out by raising the pH to a lower value than usually, i.e. the value about 4.0 to 6.0.

13 Claims, 3 Drawing Sheets

50

40

30

20

10

12,5   25   37,5   50. nm

METHOD OF PREPARING TITANIUM DIOXIDE

This is a continuation of application Ser. No. 663,492, filed Mar. 1, 1991, now abandoned.

BACKGROUND OF THE INVENTION

1. Field Of The Invention

The invention relates to a new method of preparing microcrystalline titanium dioxide, having the average crystal size <100 nm, in which a) the solid titanium dioxide hydrate is treated with a base, b) the precipitate treated with the base is treated with hydrochloric acid, and c) the precipitate treated with the base and the hydrochloric acid is neutralized.

2. Description Of The Related Art

The properties of the microcrystalline titanium dioxide differ from the properties of the usual titanium dioxide known as white pigment. The differences are due to the dissimilarities in the crystal size, for the crystal size of the microcrystalline titanium dioxide (10–100 nm) is about 5 to 10 times smaller than the crystal size of the normal titanium dioxide (160 to 250nm). As the crystal size becomes smaller the coverage of titanium dioxide in the range of visible light disappears and the pigment becomes transparent. On the other hand, the permeability of UV-light decreases. Accordingly, the microcrystalline titanium dioxide of the present invention is suitable for a UV-protective agent. Thanks to the small crystal size and the great specific surface area the titanium dioxide of the invention can be used as an effect pigment among other things in catalysts, ceramics and paints.

The preparation of microcrystalline titanium dioxide needs a process of its own in which the difficulty lies in the creation, controlling and retaining of the small particle size throughout the process. The control of the purity and the crystal size distribution are important factors when assessing the various methods of preparation. Moreover, the preparation processes must be economically profitable and ecologically beneficial. Different crystal forms can be achieved by different methods. Rutile is known as a durable crystal form and its permeability to UV-light is less than that of anatase.

It is possible to prepare microcrystalline titanium dioxide by many different methods either by gas phase or by precipitation techniques.

The titanium source or the titanium containing material can be, e.g., titanium tetrachloride, titanium alcoxide or titanium hydrate prepared from ilmenite. For the preparation of rutile, a variety of precipitation methods have been patented. In the JP patent 86/049250 a method of preparing microcrystalline titanium dioxide, after-treated with aluminum and/or silicon dioxide, from titanium hydrate prepared from ilmenite and ammonia has been briefly presented. By using ammonia the formation of foreign metal cations into the pigment is avoided but, on the other hand, one is compelled to handle troublesome ammonia reagent. The crystal form of product is not mentioned in the patent specification, but it is not necessarily rutile. In a later application JP 57/67681 of the same Japanese applicant a similar method of preparation is presented by which finely-divided anatase created. Rutile is prepared in the same patent with a recipe starting from titanium tetrachloride. The neutralization is carried out with NaOH and water additions. The precipitation concentration is 30 g/liter $TiO_2$.

In DE 3817909 preparation of microcrystalline titanium dioxide both from ilmenite and titanium tetrachloride is presented. The titanium hydrate mass prepared from ilmenite is treated with sodium hydroxide to form a titanium hydrate cake containing sodium. The pH is first set to the value of 2.8 to 3.0 with hydrochloric acid addition and at a later stage of the cooking the ratio between the acid and the titanium dioxide is adjusted to the value of 0.26. At the end of the cooking, a slurry is neutralized to the pH-value 7.5, after which the titanium dioxide is filtered and washed. Then the pigment is sand ground and after-treated with aluminum and/or silicon dioxide. Crystals of the microcrystalline titanium prepared in this way become acicular. A drawback of the method is that the pigment is not calcinated, whereby the crystals would become rounder and the crystal size could be regulated. A further drawback of this known method is that the hydrochloric acid amount which is added to create the rutile crystals is dependent on the titanium dioxide concentration.

Washing of the titanium dioxide so as to free it from precipitation salts is rather laborious, as the final neutralization is carried out at a pH-value of 7.5.

The same drawbacks also apply for the preparation of microcrystalline titanium dioxide from titanium tetrachloride presented in the same DE application.

In CA patent specification 962,142, a very similar method of preparation is disclosed as in the above-mentioned DE publication in which the starting material is ilmenite but after the neutralization of the precipitation (with ammonia to the pH-value 6.5) the composition is cooked before the filtration and the wash and the so-called calcination chemicals ($K_2O$, $P_2O_5$) are added and the titanium dioxide is calcinated. This method does not produce titanium dioxide which is sufficiently microcrystalline, instead the crystal size achieved is 50 to 150 nm.

In the method presented in the JP patent application 59223231, in which the starting material is titanium hydrate mass, acicular rutile crystals are produced, which are coated with organic aluminum compounds. The titanium dioxide is not calcinated, for which reason regulation of the crystal size is troublesome. The filtration difficulties are overcome by means of an organic after-treatment. Accordingly, no conventional inorganic treatment recipes can be applied.

In the corresponding method of preparation starting from the titanium hydrate mass JP publication 62/235215 suggests solving the filtration and drying problem by means of a filtration film of Å and freeze drying. The method is troublesome, prone to disturbances and unnecessarily expensive.

SUMMARY OF THE INVENTION

An aim of the present invention is to prepare microcrystalline titanium dioxide particles in rutile crystal form, form an advantageous crystal size and crystal size distribution utilizing inexpensive and easily handled chemicals and devices and to save as much on process chemicals as possible.

The above-mentioned aims have been reached in the present invention by means of the three-stage method mentioned, which is mainly characterized in that the base treatment of the state a) is carried out in an alkaline pH-value followed by formation of an acidic slurry wherein the final hydrochloric acid content is adjusted 8 to 25 g/liter for the precipitation of the rutile-formed titanium dioxide.

DETAILED DESCRIPTION OF THE PREFERRED EMBODIMENTS

Figure 1:
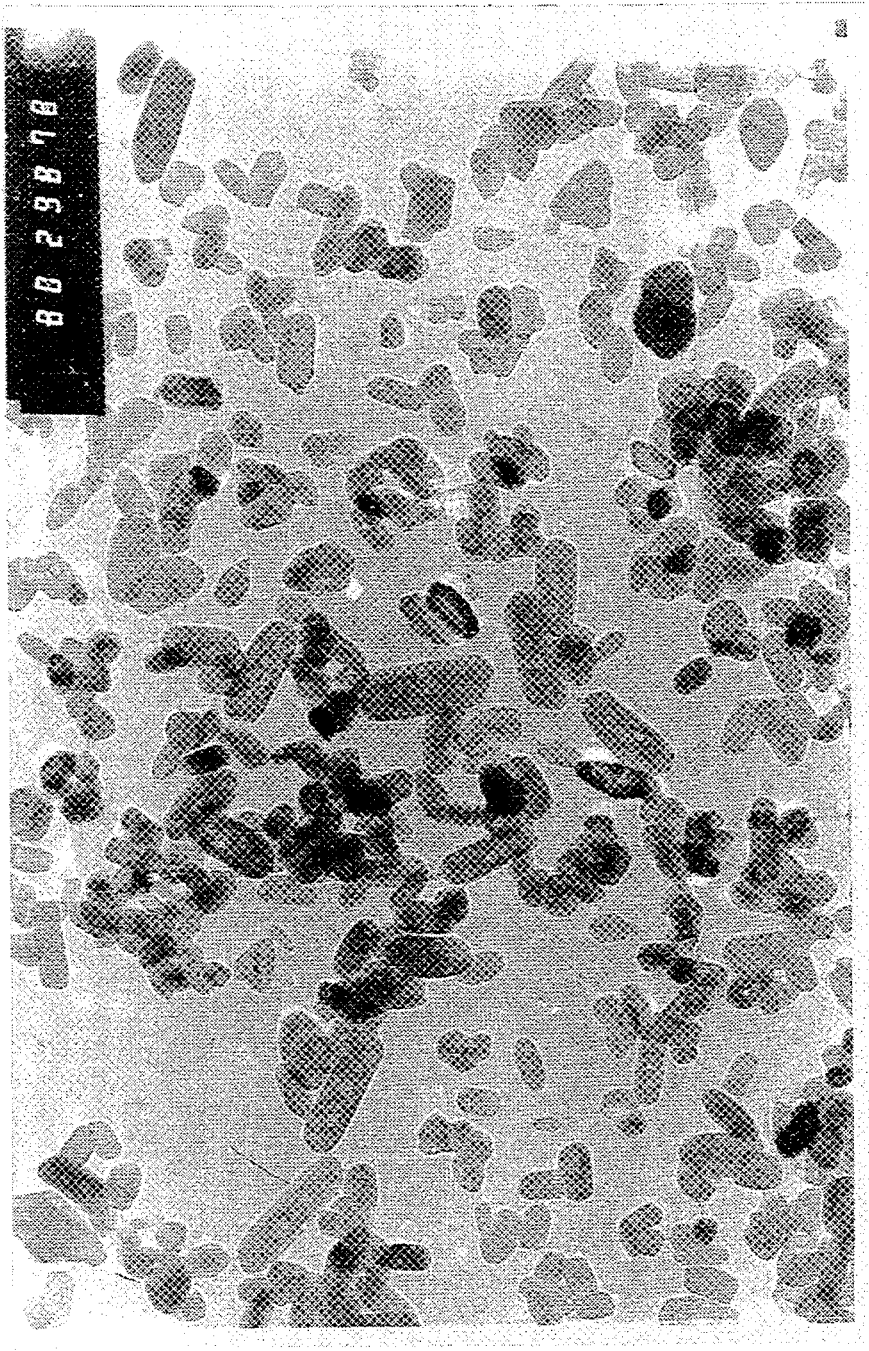
FIG. 1 is an electron microscope photo showing the end product of Example 1 of the present invention.

Accordingly, the invention differs at least in two points from the prior art.

Firstly, it has been noted that rutile crystals are produced in a solution in which the measured HCl-concentration is about 8 to 25 g/liter independent of the concentration of the titanium dioxide. Accordingly, microcrystalline titanium dioxide having a more preferable crystal form is produced when a lower hydrochloric acid concentration than usual is used. Neither is a precise knowledge of the titanium dioxide concentration necessary any more, nor must the acid addition be increased as a function of the titanium dioxide concentration. At the same time chemicals are saved because greater consistencies thus also become possible.

Secondly, it has been noted that the pH-value of the final neutralization has a decisive effect on the filtrability of the precipitation mass and to its washing off of salts. The optimal pH-values of the final neutralization varying between about 4.0 to 6.0 were found and are thus lower than previous methods. As the hydrochloric acid used in the precipitation is neutralized in the very final neutralization stage mentioned it can be seen that synergy also occurs between the two steps mentioned as far as the quality of the product and the saving of chemicals are concerned. Accordingly, the invention is decisively helpful in the technical realization of the microcrystalline titanium dioxide and is very inexpensive.

In the first stage of the process according to the present invention the titanium-containing substance is in aqueous medium brought into contact with a base.

The titanium-containing substance can be any titanium compound of a commercial process which is capable of precipitation and recrystallization. Accordingly to a preferred embodiment it is a washed titanium dioxide hydrate precipitate obtained from a sulfate process, whereby it has been prepared by:

i) bringing ilmenite, its concentrate, or any other unpurified titanium dioxide raw-material to react with sulfuric acid,
ii) dissolving the solid reaction product produced by means of water and e.g. waste acids of the process,
iii) reducing and clarifying the dissolved reaction composition,
iv) concentrating the solution obtained by dissolution from the reaction composition,
v) precipitating the titanium containing substance from the solution by means of hydrolysis, and
vi) washing the precipitation mass obtained in stage v) for the use as a titanium containing substance.

When the titanium containing substance is this kind of an intermediate product of a sulfate process the method is preferably carried out in the following manner.

The solid titanium dioxide hydrate is treated with the base, preferably with an aqueous solution of sodium hydroxide at an elevated temperature, after which the obtained titanium mass treated in base is washed, preferably hot, filtered and elutriated again. Then the temperature of the slurry is raised to about 60° C. Hereby, it is preferable that before the raise of temperature the pH is adjusted by hydrochloric acid to the value of about 1.5 to 2.0, and preferably to the value about 1.8. Finally, the concentration of the hydrochloric acid is adjusted to the mentioned final hydrochloric acid content of the stage b) for the precipitation of the microcrystalline titanium dioxide.

Hereby, it is advantageous that the base treatment i.e. the stage a) is carried out at the temperature of about 95° C. The base treatment of the stage a) is preferably carried out so that the base concentration corresponds to about 300 to 350 g NaOH/liter of $H_2O$.

The concentration of the stage b) is in the beginning preferably about 95 to 180 g/liter. As has been stated above about 8 to 25 g/liter has been adjusted as the final hydrochloric acid content of the stage b). It is more preferable to adjust the content to the value 8 to 15 g/liter and most preferable to adjust it to the value 8 to 12 g/liter i.e. about 10 g/liter.

After the final hydrochloric acid content of the stage b) mentioned has been adjusted, the composition is preferably still heated before the neutralization of the stage c). When washed titanium dioxide hydrate precipitate obtained from the sulfate process is used the heating preferably comprises a slow heating to the boiling point and cooking for about two hours. The precipitate to be treated is at the stage b) in the form of slurry, the content of which is at least 70 g/liter, preferably 70 to 180 g/liter.

The neutralization of the composition obtained from the stage b) is carried out in stage c). The neutralization is carried out by raising the pH to the value above about 4.0, but below about 6.0 and preferably to the value about 4.4 to 5.0. The neutralization is preferably carried out with sodium hydroxide or sodium carbonate.

After the neutralization of the stage c) the reaction composition is optionally treated further in stage d). After the stage c) a filtration and wash of the microcrystalline titanium dioxide precipitate is almost always carried out. When, according to the present invention the neutralization is carried out cautiously to the pH-value below 6 and still more preferably below 5, the filtration and wash succeeds particularly well and almost all sodium and chloride ions affecting detrimentally the further treatment of the produce can be removed from the precipitate.

When the filtration and wash stage is performed, the further treatment stage d) preferably comprises at least the calcination of the purified neutralized composition, preferably at the temperature 350° to 800° C. Hereby it is particularly preferable to adjust the crystal size of the microcrystalline titanium dioxide by means of the calcination temperature. The crystal size and the crystal size distribution can be readily and precisely regulated by the calcination parameters of salt-free, rutile-formed titanium dioxide mass. The crystals of the calcinated pigment are ellipsoidal in form (oval).

The further treatment d) of the method according to the invention can also comprise stages which are similar to the aftertreatment stages of the usual titanium dioxide pigment. Hereby, similar dispersion and weather-resistance properties are achieved as with titanium dioxide pigment. The product obtained from the calcination can be rough-ground e.g. with a hammer grinder and finely ground e.g. by sand grinder.

After the grinding the microcrystalline titanium dioxide is treated with treatment recipes of titanium dioxide pigment in use so that the surface of titanium dioxide is coated with aluminum, silicon and/or zirconium oxide hydrate or oxide. On the surface of the pigment there might be from 0 to 10% of aluminum oxide, from 0 to 10% of silicon dioxide and zirconium oxide calculated as zirconium from 0 to 5% (all percentages in the patent are by weight). The treated pigment is dried, before which it is treated with an organic auxiliary agent, such as trimethylolethane or silicon (see FI patent specification 57124).

The microcrystalline $TiO_2$-pigment can finally be ground with an efficient mill. The finely-ground microcrystalline $TiO_2$-pigment treated with various coatings is suitable for use as effect pigments e.g. in car paints, as UVA- and UVB-protective agent in cosmetic, as UV-protective agent in timber protection or in packing plastics for foodstuffs to protect a UV-light sensitive foodstuff.

EXAMPLE 1

The preparation of titanium dioxide by sulfate method is commenced by the ilmenite concentration reaction together with sulfuric acid. The created solid reaction cake is dissolved by means of water and waste acids. The impurities are removed and the iron sulfate is crystallized away. The titanium containing solution is concentrated and the titanium dioxide hydrate is precipitated by hydrolyzation. This precipitation mass is washed in several stages so as to become free of salts. 1400 g of this washed filtration cake is elutriated with 1200 ml of distilled water. The slurry is made strongly basic by adding at 60° C. 1070 ml of NaOH-solution (700 g/liter). The temperature of the slurry is raised to 95° C. and the slurry is agitated for two hours at this temperature. After this the sulfate ions are removed from the titanium hydroxide mass by washing the slurry for so long with hot distilled water that no sulphates are found in the filtrates measured by the barium chloride precipitation test.

The filtrate cake which is free from sulfates is elutriated into distilled water so that the concentration of the dispersion expressed as titanium dioxide is about 180 g/liter. The pH of the slurry is set to 1.8 by adding 37% hydrochloric acid to the slurry. The slurry temperature is raised to 60° C. with concurrent continuous agitator. The slurry is agitated at 60° C. for 30 minutes, after which the acid content of the slurry is set to 10 g HCl/liter by an addition of 37% hydrochloric acid for the formation of rutile formed crystals. The temperature of this dispersion is raised slowly under constant agitation to 90° C. The slurry is cooked under agitation at this temperature for 120 minutes.

Finally, the slurry is neutralized with sodium carbonate or sodium hydroxide so that the pH settles at 4.7 to 4.8. If the neutralization result is more basic the washing off of the sodium ions becomes more difficult and if the neutralization result is more acidic the washing off of the chloride ions becomes more difficult. The neutralized slurry is filtered and washed with (4 liters of) distilled water. The dry content of the filtrate cake is about 30%. An X-ray diffraction diagram was taken of the dried filtrate cake and the microcrystalline titanium dioxide is found to be of rutile crystal form.

Figure 2:
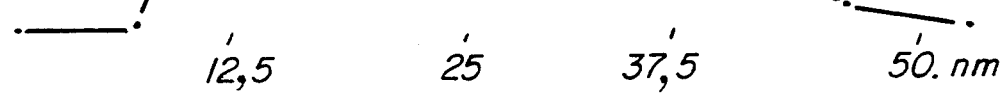
FIG. 2 is a graph showing a crystal size distribution diagram of the end product shown in FIG. 1.

The titanium dioxide filtrate cake is calcinated at a temperature of 500° C. for one hour. The average crystal size is measured as about 25 nm from an electron microscope picture of the calcinated rutile-formed product; the distribution is from 10 to 50 nanometers. The sodium content of the calcinated product is below 0.1% and the chloride content below 0.05%. The electron microscope picture of the created product is presented in FIG. 1. A crystal size distribution diagram of this product is shown in FIG. 2.

The titanium dioxide free of salts is elutriated as a thick slurry in distilled water with the help of a dispersing agent. The grinding is carried out in a sand mill. The crystals ground apart from each other are after-treated according to the planned use with an aluminum, silicon and/or zirconium compound. Known recipes for the treatment of titanium dioxide pigments such as e.g. FI patent specification 62130 are used.

The treated microcrystalline $TiO_2$ is dried. Before drying an organic agent, such as trimethylolethane (TME) or silicone (see FI patent specification 57124) is added. The dried microcrystalline $TiO_2$ is spray-ground into finely-divided powder having an particle size below 200 nm.

EXAMPLE 2

Figure 3:
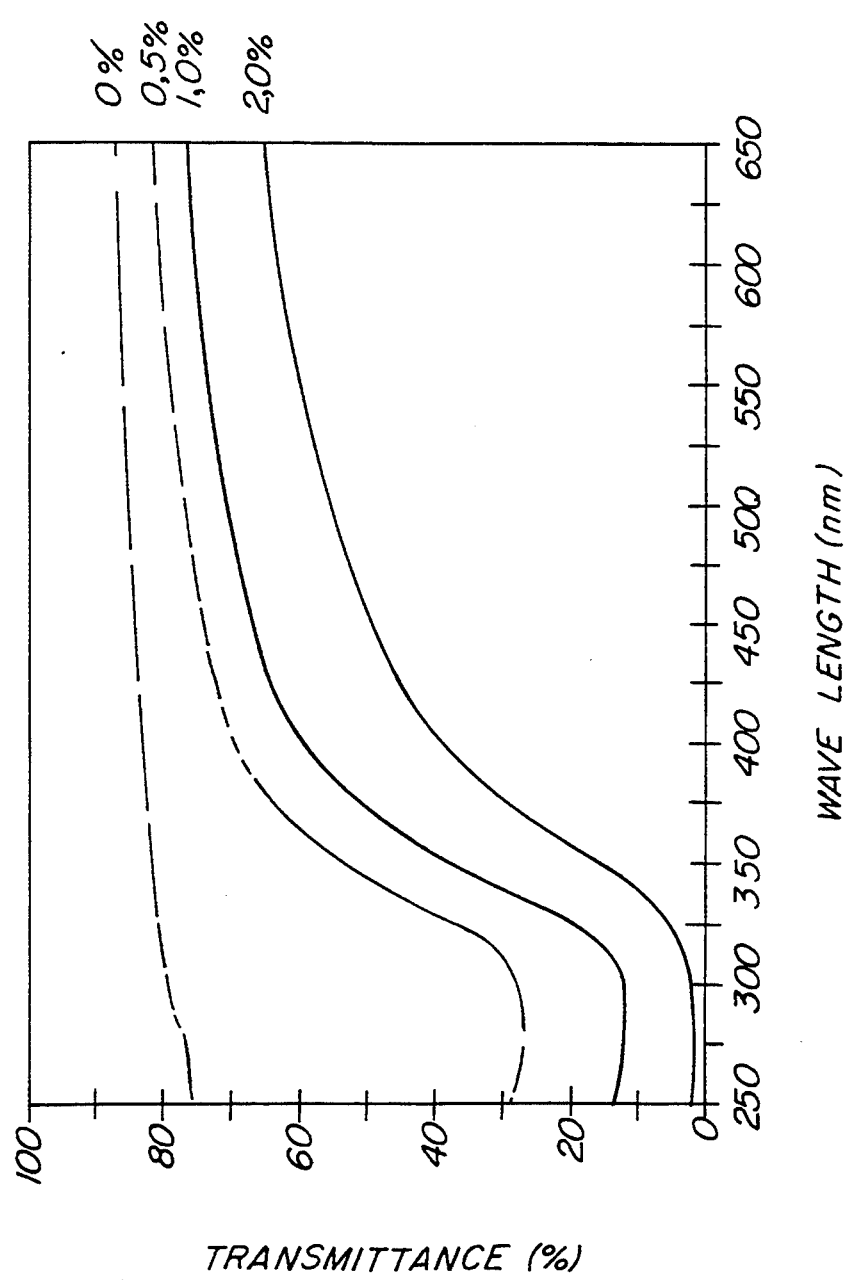
FIG. 3 is a graph illustrating transmission curves of LDPE films which were prepared in accordance with Example 2 of the present invention.

Microcrystalline titanium dioxide was precipitated and calcinated as in example 1, and the crystal size obtained was 25 . The water dispersion of the calcinated microcrystalline titanium dioxide was ground in a sand mill as in example 1. The pigment slurry was diluted to a $TiO_2$-content of 225 g/liter and heated to the temperature 40° C. An amount corresponding to 0.5% of $Al_2O_3$ calculated on the $TiO_2$ of the slurry of acidic aluminum sulfate solution was added to the slurry. During this addition the pH of the slurry sank to a value 2.5. The slurry was neutralized with sodium carbonate solution to the value 6.4. After the neutralization the treated titanium dioxide pigment was recovered by filtering. The filtrate cake was washed with water from which the salts had been removed by means of an ion exchanger. 4% of dimethylpolysiloxane calculated on the $TiO_2$ was added to the washed filtrate cake. The pigment was washed and ground in a spray mill. The particle size of the dried and spray-ground pigment was below 200 . LDPE plastic films were prepared, to which different amounts of microcrystalline titanium dioxide were added. The thickness of the films was 25 um and the contents of microcrystalline titanium dioxide were 0, 0.5, 1.0, and 2.0% The light and UV-radiation permeabilities of these films were measured. See FIG. 3.

EXAMPLE 3

A titanium hydrate mass according to example 1 treated with base, which had been washed and filtered, was elutriated in water so that the concentration of the dispersion expressed as titanium dioxide is about 180 g/liter. The temperature of the slurry was raised to 60° C. under constant agitation. The acid content of the slurry was set by an addition of 37% hydrochloric acid to 10 g HCl/liter. The temperature of this dispersion is raised slowly under constant agitation to 90° C. The slurry is cooked at this temperature for 120 minutes.

The slurry is neutralized, filtered and washed as in example 1. The titanium dioxide filtrate cake is calcinated at the temperature of 500° C. for one hour. The product produced is on the basis of an X-ray diffraction diagram rutile-formed microcrystalline titanium dioxide. Of the chemicals used in the preparation below 0.05% of sodium has remained in the titanium dioxide on the basis of atom absorption spectrophotometric determinations and below 0.15% of chloride on the basis of X-ray fluorescence determination.

EXAMPLE 4

The filtrate cake free from sulfates prepared according to example 1 is elutriated into distilled water so that the concentration of the slurry expressed in titanium dioxide is about 95 to 100 g/liter. The pH of the slurry is set to 1.8 by adding 37% hydrochloric acid to the slurry. Under constant agitation the temperature of the dispersion is raised to 60° C. At this temperature the solution is agitated for 30 minutes, after which the oxygen content of the slurry is set by a 37% hydrochloric acid addition to 9 g HCl/liter so as to produce rutile-formed crystals. The temperature of this slurry is raised slowly under constant agitation to 90° C. The slurry is cooked under agitation at this temperature for 120 minutes.

Finally, the slurry is neutralized as in example 1 to the pH-value 4.7 to 4.8 and washed as in example 1. The crystal form of the precipitated and dried product was checked by an X-ray diffraction method. It was found to be of rutile form. The crystal size is regulated by calcination parameters.

EXAMPLE 5

The filtrate cake free from sulfates prepared according to example 1 is elutriated into distilled water so that the concentration of the slurry expressed in titanium dioxide is about 140 g/liter. The pH of the slurry is set to 1.8 by adding 37% hydrochloric acid to the slurry. Under constant agitation the temperature of the slurry is raised to 60° C. At this temperature the slurry is agitated for 30 minutes, after which the acid content of the slurry is set by a 37% hydrochloric acid addition to 10 g HCl/liter so as to produce rutile-formed crystals. The temperature of this slurry is raised slowly under constant agitation to 90° C. The slurry is cooked under agitation at this temperature for 120 minutes.

Finally, the slurry is neutralized as in example 1 to the pH-value 4.7 to 4.8 and washed as in example 1. The crystal form of the precipitated and dried product was checked by an X-ray diffraction method. It was found to be of rutile form.

COMPARATIVE EXAMPLE 6

The filtrate cake free from sulfates prepared according to example 1 is elutriated into distilled water so that the concentration of the dispersion expressed in titanium dioxide is about 120 g/liter. The pH of the slurry is set to 1.8 by adding 37% hydrochloric acid to the slurry. Under constant agitation the temperature of the slurry is raised to 60° C. At this temperature the slurry is agitated for 30 minutes, after which the acid content of the slurry is set by a 37% hydrochloric acid addition to 6 g HCl/liter. The temperature of this slurry is raised slowly under constant agitation to 90° C. The slurry is cooked under agitation at this temperature for 120 minutes.

Finally, the slurry is neutralized as in example 1 to the pH-value 4.7 to 4.8 and washed as in example 1. The crystal form of the precipitated and dried product was checked by an X-ray diffraction method. It was found to be of mostly anatase form. The titanium dioxide filtrate cake is calculated at the temperature of 500° C. for one hour. In the calcination the product does not turn to rutile completely.

EXAMPLE 7

Precipitated and washed rutile-formed titanium dioxide is calcinated according to example 1 in various temperatures for one hour. The crystal size can be handily regulated by changing the calcination conditions, as appears from the electron microscope pictures.

TABLE

| Temperature | Crystal Size | Top | Size Distribution |
|---|---|---|---|
| 400° C. | 24 nm | 24 nm (39%) | 10–50 nm |
| 500° C. | 26 nm | 25 nm (37%) | 10–50 nm |
| 550° C. | 30 nm | 27 nm (33%) | 10–50 nm |
| 600° C. | 35 nm | 31 nm (36%) | 10–60 nm |
| 650° C. | 45 nm | 40 nm (25%) | 10–70 nm |

Finally, the slurry is neutralized with sodium hydroxide or sodium carbonate to the pH-value 4.5. In this pH the filtration and wash are carried out most successfully. The precipitated rutile-formed titanium dioxide is filtrated and washed with two liters of distilled water. The dry content of the washed and filtrated cake is about 30% and the measured Na-content below 0.1% and Cl-content below 0.05%.

The washed and filtrated cake is calcinated at the temperature of 500° C. for one hour. Hereby the average crystal size will be about 25 nanometers and the distribution 20–50. The agglomerates formed in the calcination are ground in the sand mill. A thick water dispersion is prepared from the titanium dioxide by using an organic dispersion additive as an aid. The grinding succeeds very well because the titanium dioxide is as free as possible from salts.

The crystals ground apart from each other are after-treated according to the planned use with aluminum, silicon or zirconium compounds. As the recipe is used known treatment recipes of titanium dioxide pigments, such as e.g. FI patent specification 62130 (1980).

The treated microcrystalline TiO$_2$ is dried. Before drying an organic material, such as trimethylolethane (TME) or silicone, is added, see FI patent specification 57124 (1978). The dried microcrystalline TiO2 is ground to finely-divided powder having the crystal size of below 200 nm.

What is claimed is:

1. Method of preparing rutile microcrystalline titanium dioxide having crystals with an average crystal size in the range of 24 nm to 30 nm from solid titanium dioxide hydrate comprising the steps of:
    (a) forming an aqueous alkaline pH slurry comprising said titanium dioxide hydrate and a base;
    (b) separating solids from said alkaline pH slurry;
    (c) forming an acidic slurry comprising said solids and hydrochloric acid, said acidic slurry having an hydrochloric acid content of between about 8–12 g/l which precipitates rutile titanium dioxide particles;
    (d) adjusting said acidic slurry formed in step (c) to a pH value of 4–6 to form a neutralized slurry containing said rutile titanium dioxide particles;
    (e) separating said rutile titanium dioxide particles from said neutralized slurry
    (f) washing the rutile titanium dioxide particles to obtain washed rutile titanium dioxide particles; and
    (g) calcining said washed rutile titanium dioxide particles at a temperature of 400°–550° C. to form said rutile microcrystalline titanium dioxide.

2. A method as recited in claim 1 wherein said alkaline pH slurry formed in step (a) comprises a solid content, expressed as titanium dioxide, of at least 70 g/liter.

3. A method as recited in claim 1 wherein in said step (a) said base is provided in a concentration of about 300–350 g NaOH/liter of $H_2O$.

4. A method as recited in claim 1 wherein in said step (a) said base comprises NaOH and said step (a) comprises heating said alkaline pH slurry.

5. A method as recited in claim 4 wherein said step (a) comprises forming said slurry at a temperature of about 60° C., then raising said temperature for about 2 hours to about 95° C., followed by washing said slurry with warm water.

6. A method as recited in claim 1 wherein said step (c) comprises raising the temperature of said slurry to about 60° C.

7. Method as recited in claim 6 wherein in said step (c) said slurry comprises a solid content of about 95–180 g/l, expressed as titanium dioxide.

8. Method as recited in claim 6 wherein in said step (c) said slurry has a pH of about 1.5–2.0.

9. Method as recited in claim 8 wherein in said step (c) said slurry has a pH of about 1.8.

10. Method as recited in claim 6 wherein in said step (c), said hydrochloric acid is provided as 37% HCl.

11. Method as recited in claim 1 wherein said step (c) comprises raising the temperature of said slurry to at least 90° C. over a period of about 120 minutes.

12. Method as recited in claim 1 wherein said step (d) comprises contacting said acidic slurry with a member selected from the group consisting of sodium carbonate and sodium hydroxide, and wherein step (e) comprises filtering said neutralized slurry.

13. Method as recited in claim 1 further comprising, subsequent to said step (g) grinding said rutile microcrystalline titanium dioxide.

* * * * *